United States Patent [19]
Betts et al.

[11] Patent Number: 5,280,503
[45] Date of Patent: Jan. 18, 1994

[54] DATA COMMUNICATION SYSTEM WITH DATA RATE THROTTLING

[75] Inventors: William L. Betts, St. Petersburg; Gordon Bremer, Clearwater, both of Fla.

[73] Assignee: AT&T Bell Laboratories, Murray Hill, N.J.

[21] Appl. No.: 820,111

[22] Filed: Jan. 13, 1992

Related U.S. Application Data

[63] Continuation-in-part of Ser. No. 588,656, Sep. 26, 1990, Pat. No. 5,230,010.

[51] Int. Cl.$^5$ .......................................... H04L 23/00
[52] U.S. Cl. .................................. 375/121; 341/61
[58] Field of Search ................... 375/8, 10, 39, 121, 375/122; 370/84; 341/61, 141

[56] References Cited
U.S. PATENT DOCUMENTS

| | | | |
|---|---|---|---|
| 4,941,154 | 7/1990 | Wei | 375/39 |
| 5,008,902 | 4/1991 | Key et al. | 375/121 |
| 5,103,227 | 4/1992 | Betts | 341/61 |

Primary Examiner—Stephen Chin
Attorney, Agent, or Firm—Ronald D. Slusky

[57] ABSTRACT

Fractional rate modulation is accomplished by separating incoming data into frames of bits. Each frame in partitioned into bit words of unequal lengths. The words are divided by a modulus to obtain remainders. The remainders are transmitted using, for example, QAM modulation. At the receiving end, the process is reversed. The ratio of baud rate of the system to the incoming bit rate defines the modulus as well as the number of QAM modulation points. A "data rate throttling" technique takes advantage of the capabilities provided by the foregoing to allow the rate at which data is channel mapped and transmitted over a communication channel to be easily varied in small increments.

6 Claims, 8 Drawing Sheets

FRACTIONAL BIT CODING
BITS/BAUD AND MODULUS (NUMBER OF SIGNAL POINTS)

| DATA RATE | BAUD RATE | | | | | |
|---|---|---|---|---|---|---|
| | 2400 | 2743 | 2800 | 2880 | 3086 | 3200 |
| 24000 | 10  1024 | $\frac{35}{4}$  431 | $\frac{60}{7}$  381 | $\frac{25}{3}$  323 | $\frac{70}{9}$  220 | $\frac{15}{2}$  182 |
| 21600 | 9  512 | $\frac{63}{8}$  235 | $\frac{54}{7}$  211 | $\frac{15}{2}$  182 | 7  128 | $\frac{27}{4}$  108 |
| 19200 | 8  256 | 7  128 | $\frac{48}{7}$  116 | $\frac{20}{3}$  102 | $\frac{56}{9}$  75 | 6  64 |
| 16800 | 7  128 | $\frac{49}{8}$  70 | 6  64 | $\frac{35}{6}$  58 | $\frac{49}{9}$  44 | $\frac{21}{4}$  39 |
| 14400 | 6  64 | $\frac{21}{4}$  39 | $\frac{36}{7}$  36 | 5  32 | $\frac{14}{3}$  26 | $\frac{9}{2}$  23 |
| 12000 | 5  32 | $\frac{35}{8}$  21 | $\frac{30}{7}$  20 | $\frac{25}{6}$  18 | $\frac{35}{9}$  15 | $\frac{15}{4}$  14 |
| 9600 | 4  16 | $\frac{7}{2}$  12 | $\frac{24}{7}$  11 | $\frac{10}{3}$  11 | $\frac{28}{9}$  9 | 3  8 |
| 7200 | 3  8 | $\frac{21}{8}$  7 | $\frac{18}{7}$  6 | $\frac{5}{2}$  6 | $\frac{7}{3}$  6 | $\frac{9}{4}$  5 |

FIG. 7

FRACTIONAL FRAMES

| DATA RATE | BAUD RATE | | | | | |
|---|---|---|---|---|---|---|
| | 2400 | 2743-8 | 2800-7 | 2880-6 | 3086-9 | 3200-4 |
| 24000 | 10 | 99989998 | 9898989 | 988988 | 888878887 | 8787 |
| 21600 | 9 | 88888887 | 8887887 | 878787 | 777777777 | 7776 |
| 19200 | 8 | 77777777 | 7777776 | 776776 | 766676666 | 6666 |
| 16800 | 7 | 76666666 | 6666666 | 666665 | 656565655 | 6555 |
| 14400 | 6 | 65556555 | 6555555 | 555555 | 554554554 | 5454 |
| 12000 | 5 | 54454454 | 5445444 | 544444 | 444444443 | 4443 |
| 9600 | 4 | 43434343 | 4343433 | 433433 | 433333333 | 3333 |
| 7200 | 3 | 33232323 | 3232323 | 323232 | 322322322 | 3222 |

FIG. 8

DATA COMMUNICATION SYSTEM WITH DATA RATE THROTTLING

CROSS-REFERENCE TO RELATED APPLICATION

This is a continuation-in-part of U.S. patent application Ser. No. 588,656, filed Sep. 26, 1990, now U.S. Pat. No. 5,230,010, entitled "Fractional Rate Modulation."

BACKGROUND OF THE INVENTION

1. Field of the Invention

The present invention relates to data transmission and, in particular, to the transmission of data by, for example, voiceband modems, at selectable bit rates. More specifically, this invention pertains to a method and apparatus useful for data transmission using quadrature amplitude modulation and, more particularly, to a method and apparatus which may be optimized to a particular communication channel by using fractional rate modulation.

2. Description of the Prior Art

It is well known in the art of signal communications that the optimum performance of a communication channel is achieved when the data rate of the channel is equal to $B \times \log_2 S/N$, where S/N is the signal-to-noise ratio and B is the bandwidth. However, data communication systems are also constrained by a number of other parameters which make it very difficult to operate at the idealized bandwidth described above. For example, data communication systems using quadrature amplitude modulation (QAM) are typically constrained by standardized data rates, power levels and bit rates to a ratio of the bits/baud having to be an integer. As a result, in general the data rate of a QAM system is usually lower than the channel capacity.

Methods of fractional rate encoding are known. These include multidimensional trellis codes and a simple encoded method identified in a reference below. See, for example, Forney et al, "Efficient Modulation for Band-Limited Channels," *IEEE Journal on Selected Areas in Communications*, Vol. SAC-2, No. 5, September 1984, pg. 637; and Lee-Fang Wei, "Trellis-Coded Modulation with Multidimensional Constellations," *IEEE Transactions on Information Theory*, Vol. IT-33, No. 4, July 1987, pp. 483–501. These methods are not generally applicable at all rates. They require a block encoder to partition "inner" and "outer" sets of points for selective transmission in one or more bauds of a larger block or frame. A unique encoder is required for each combination of bit rate and baud rate.

The commonly assigned, co-pending U.S. patent application of W. L. Betts et al entitled, "Modulus Converter for Fractional Rate Encoding," Ser. No. 588,658, filed Sep. 26, 1990, hereby incorporated by reference, discloses a method and apparatus which allows for, and is generally applicable to, any bit rate and baud rate combination. The baud rate is chosen to match the optimum bandwidth of the channel. A modulus, m, is computed from the smallest integer:

$$m \geq 2^{(bit\ rate/baud\ rate)}.$$

Data is encoded for transmission using a signal constellation with m points. Each point in the constellation is identified by a unique integer index in the range 0 to $m-1$.

A frame length is selected by reducing the ratio of bit rate/baud rate to the lowest common denominator. The numerator identifies the number of bits in a frame and the denominator identifies the number of bauds in a frame, F. A modulus converter is used to convert the bits to F words of modulus m. Each word is used as the index to select the respective unique point in the constellation for transmission.

SUMMARY OF THE INVENTION

The present invention is directed to a technique, referred to as "data rate throttling," which takes advantage of the capabilities of the above-described modulus converter to allow the rate at which data is channel mapped and transmitted over a communication channel to be easily varied in small increments, as compared to the rather coarse increments allowed by the techniques known in the prior art.

In particular, apparatus embodying the principles of the invention generates bit and baud rate signals respectively defining bit and baud rates at which a stream of input data is desired to be communicated over a communications channel. The modulus converter operates on the input data to generate an index value for each of a succession of baud intervals, each generated index value being one of a working set of m different index values, m being the aforementioned modulus and being equal to the smallest integer not less than $2^c$, where c is the ratio of said bit rate to said baud rate. For each different index value generated by the modulus converter, an individual one of a predetermined plurality of signal points, or channel symbols, is selected, that one channel symbol being uniquely associated with said each index value, and a signal representing the selected channel symbols is transmitted over the communications channel. In accordance with the invention, at least one of said bit and baud rate signals is varied—such as when it is desired to reduce the bit rate to a "fall back" rate and/or to thereafter return to the original rate—in such a way as to vary the value of c, thereby causing the modulus converter to change modulus m and thereby causing the selection of channel symbols to be made from a correspondingly changed number of the channel symbols of the aforesaid plurality. Advantageously, the use of the modulus converter means that the bit rate can be varied in small increments and, in particular, so that at least one value of m—in contrast to the typical prior art—is other than an integer power of 2. It is this idea of being able to change the bit rate in small increments up and down that gives rise to the term "data rate throttling."

In accordance with a feature of the invention, data rate throttling can be used in a system which employs trellis or other redundancy coding. In preferred embodiments of such applications, a stream of constellation subsets are identified in the conventional way—using a trellis or redundancy code to encode the so-called "coded bits" of the input bit stream at a bit rate that is fixed—while the data rate throttling is applied to the bit stream that is used to select the symbols within the identified subsets.

The invention may be used to particular advantage in redundancy-coded applications in conjunction with the index value assignment scheme disclosed in the commonly-assigned application of W. L. Betts et al filed of even date herewith entitled "Index Assignment in Redundancy-Coded Data Communication Systems," Ser. No.07/820,113, hereby incorporated by reference.

BRIEF DESCRIPTION OF THE DRAWING

FIG. 5 shows a signal constellation for transmitting data in accordance with this invention;

FIG. 6 shows a table indicating the fractional data rate and the corresponding number of signal points for various input data rates and baud rates;

FIG. 7 shows how an incoming data bit stream is partitioned into frames of various lengths for various baud rates; and FIG. 8 shows another signal constellation for transmitting data in accordance with this invention.

DETAILED DESCRIPTION

Figure 1:
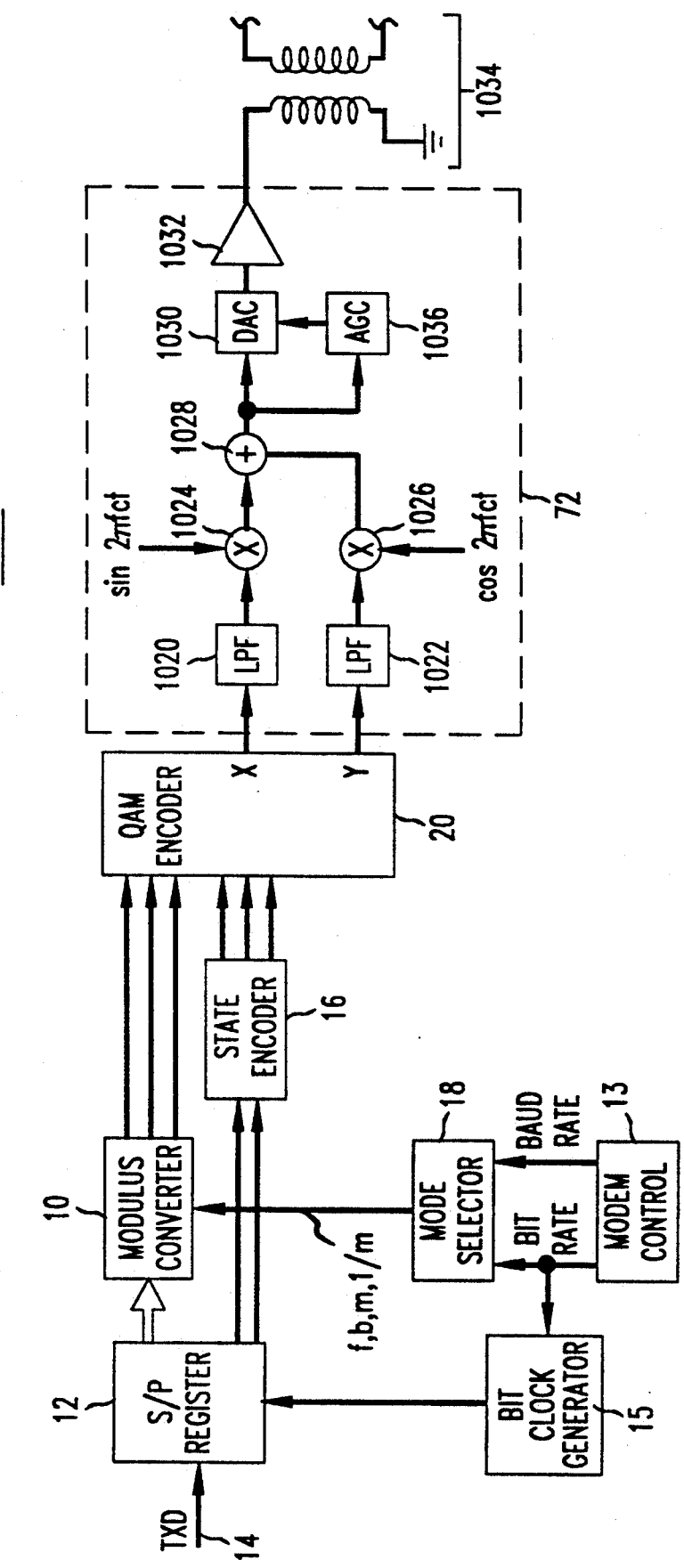
FIG. 1 shows a schematic diagram for a transmitter for optimal data transmission using fractional rate modulation in accordance with this invention.

Referring now to the Figures, FIG. 1 shows the transmitter section 1000 of a modem constructed for optimum data transmission. The section includes a modulus converter 10, described in more detail below, which receives data bits in parallel from a serial-to-parallel data converter, or register, 12. The modem also includes a mode selector 18 which is activated by two signals: a baud rate signal which defines the baud rate of the particular channel to be used by the modem and a bit rate of the incoming data TXD on lead 14. These two signals are provided by modem control 13 which may be, for example, a microprocessor that controls various operations within the modem. Based on these signals, the mode selector generates parameters f, b, and m required for the modulus converter 10, as described below. Additionally, the bit rate signal is applied to bit clock generator 15, which generates a clock at the bit rate which is used, inter alia, to clock the incoming data into register 12.

Two or more bits from the output of the serial-to-parallel register 12 are fed to a state encoder 16 which uses, for example, a Viterbi encoding scheme as defined by a trellis encoder such as the CCITT V.33 standard to generate three trellis-encoded bits. The bits generated by state encoder 16, as well as the remaining bits from converter 10, are all fed in parallel to a standard QAM encoder 20 which may be, for example, a look-up table or a RAM. The QAM encoder 20, in response, generates two orthogonal signals X and Y which define uniquely one of the points of a preselected signal constellation. The signals X and Y, representing the X and Y coordinates of the point thus defined, are fed to a transmitter 72 and, in particular, to two low pass filters 1020, 1022 therein. The filtered signals are then multiplied in multipliers 1024, 1026 with two orthogonal sinusoidal signals at the carrier frequency $f_c$. The outputs of the multipliers are added by summer 1028. Since the operations described so far are performed preferably using digital circuitry, the output of summer 1028 is converted to analog form by a digital-to-analog converter (DAC) 1030. This analog signal is amplified by amplifier 1032 and the output thereof, constituting the output of transmitter 72, is then transmitted over a channel 1034. The amplitude of the signal transmitted over channel 1034 is regulated by an automatic gain control (AGC) circuit 1036 within transmitter 72.

Figure 2:
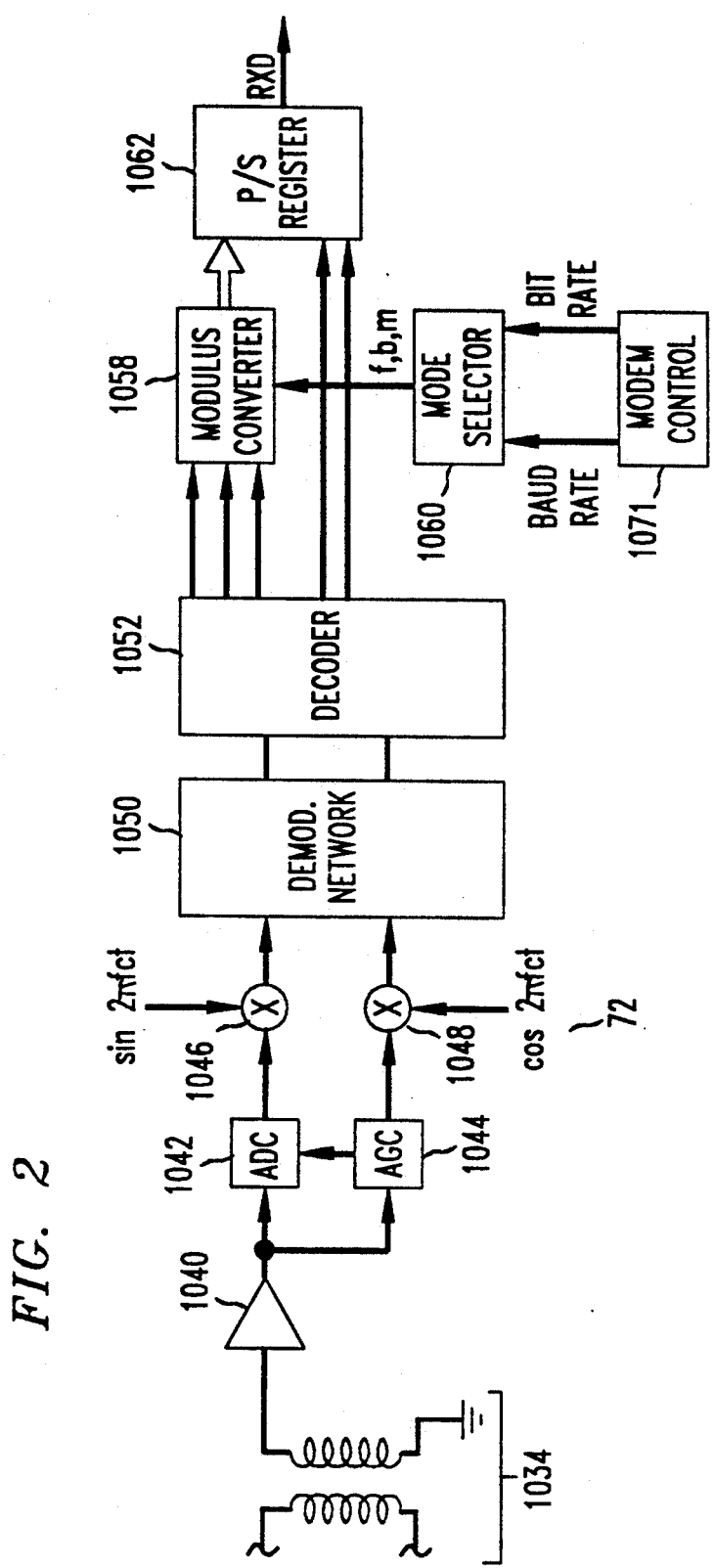
FIG. 2 shows a schematic diagram for a receiver matching the transmitter of FIG. 1.

As shown in FIG. 2, at the receiver end of channel 1034, the signal is fed to an amplifier 1040. The analog amplified signal from amplifier 1040 is converted to a digital signal by an analog-to-digital converter 1042. The operation of converter 1042 is regulated through an automatic gain control (AGC) circuit 1044. The output of the converter is fed in parallel to two multipliers 1046, 1048 for multiplication with the two orthogonal signals as shown to obtain the two coordinates X and Y of the received signal points. These two coordinates are sent to a demodulating network 1050 which performs signal equalization, phase tracking, Viterbi decoding and other similar functions required for standard QAM data transmission. The signals from the network 1050 are then decoded by decoder 1052. The decoder restores the two or more trellis-encoded bits which are routed directly to the parallel-to-serial register 1062. The remaining bits are transmitted to a modulus converter 1058 for converting them back to the arithmetic base originally sent. The parameters for converter 1058 are generated by a mode selector 1060 which is similar to mode selector 18 from a modem control 1071 which is similar to modem control 13. Finally, the parallel output of modulus converter 1058 is transformed, along with the aforementioned bits from decoder 1052, into a serial bit stream RXD by a parallel/serial register 1062.

Figure 3:
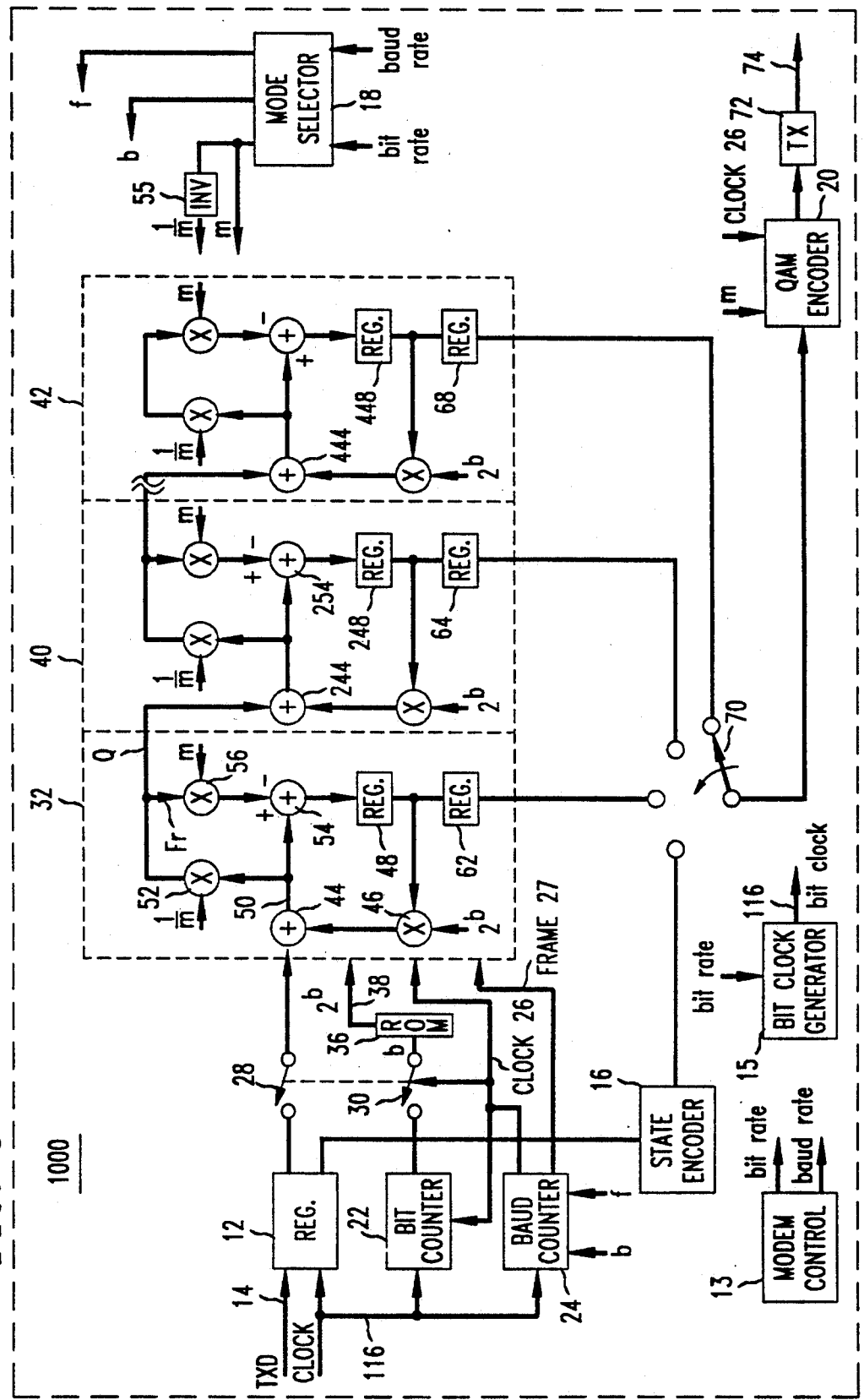
FIG. 3 shows details of the modulus converter for the transmitter of FIG. 1.

The circuitry of FIG. 1 is shown in greater detail in FIG. 3. All elements in FIG. 3 which do not have corresponding elements in FIG. 1 are components of modulus converter 10. Thus, in particular, transmitter circuit 1000 includes serial in/parallel out shift register 12 for receiving data bits on line 14, under the control of clock pulses provided by bit clock generator 15 on line 116. Mode selector 18, responsive to the bit- and baud-rate signals provided by modem control 13, generates three control parameters for the modulus converter, viz., m, the number of constellation signal points (for uncoded modulation) or subset signal points (for coded modulation) required by QAM encoder 20 to transmit the data signals; b, the number of bits per each word; and f, the number of words per frame, as defined in FIGS. 6 and 7. The parameters m and f are constant for a given pair of baud and bit rates. The parameter b changes as shown in FIG. 7. For example, for a 24000 bit/sec, 3200 baud transmission, m=182, f=4 and b=7 or 8. (In coded modulation applications, the various parameters refer to the uncoded portion of the bit stream).

The clock pulses on line 116 are used by a bit counter 22 and a baud counter 24. For the example given above (i.e., 24000 bit/sec, 3200 baud) initially, b may be equal to 8.

While the data bits are entered serially into register 12, counter 22 counts the bits contained therein. Baud counter 24 keeps track of the number of bits received; and when this number equals b, the baud counter generates an enabling signal on line 26. Register 12 has an output port illustrated in FIG. 3 symbolically as a switch 28. Similarly, counter 22 has an output port symbolized by a switch 30. In response to the enabling signal on line 26, switch 28 transfers in parallel the b bits found in register 12 to a remainder cell 32. Similarly, in response to the enabling pulse on line 26, switch 30 also transmits count b from counter 22 to a look-up table such as a ROM 36. In response, ROM 36 generates a binary signal equal to $2^b$ on line 38. This $2^b$ is the modulus or base of the input data word in register 12. Finally, the signal on line 26 is also used as a clock signal to clock the various elements of the remainder cell 32, as well as the other remainder cells described more fully below.

Remainder cell 32, as well as the other remainder cells such as cells 40 and 42, is used to calculate the remainder in modulus m for the f bauds in a frame. More particularly, each remainder cell calculates the remainder for one of the bauds, with the higher remainder cells also taking into account the integer portion of the quotient generated by the previous cells. Thus, the number of remainder cells required for a conversion is equal to f. In FIG. 3, the first cell 32, second cell 40, and last or most significant digit cell 42 are shown. Since all the cells are identical, the cell between cells 40 and 42 (and more intermediate cells for converters with more bauds per frame) are not shown for the sake of simplicity.

For the next word $X_1$, a similar iteration occurs with two exceptions: since new byte $X_1$ has only 7 bits, b now is changed to 7 in accordance with the arrangement of bits shown in FIG. 7; and adder 44 adds $R_1 * 2^b$ to $X_1$. The rest of the remainder cells operate on this new sum as described above. The multiplier is important because it allows successive words of various bits in size to be successively converted. Conventional modulus or base conversion would require all bits in a frame to be held in a single large register with increased complexity. After four iterations, during which each of the cells is progressively brought into play, the registers in the remainder cells contain the remainders required to uniquely define f bauds from register 12 in modula m. The intermediate results of the iterations and the final contents of the registers 48, 248, 448 are shown in Table I below:

TABLE I

| BAUD | INPUT | $R_0$ | $R_1$ | $R_2$ | $R_3$ |
|---|---|---|---|---|---|
| 0 | $X_0$ | $R_0 = \text{rem } X_0$ | $R_1 = \text{mod } X_0$ | | |
| 1 | $X_1$ | $R'_0 = 2^b R_0 + X_1$ | $R'_1 = 2^b R_1 + \text{mod } R'_0$ | $R_2 = \text{mod } R'_1$ | |
|   |   | $R_0 = \text{rem } R'_0$ | $R_1 = \text{rem } R'_1$ | | |
| 2 | $X_2$ | $R'_0 = 2^b R_0 + X_2$ | $R'_1 = 2^b R_1 + \text{mod } R'_0$ | $R'_2 = 2^b R_2 + \text{mod } R'_1$ | $R_3 = \text{mod } R'_2$ |
|   |   | $R_0 = \text{rem } R'_0$ | $R_1 = \text{rem } R'_1$ | $R_2 = \text{rem } R'_2$ | |
| 3 | $X_3$ | $R'_0 = 2^b R_0 + X_3$ | $R'_1 = 2^b R_1 + \text{mod } R'_0$ | $R'_2 = 2^b R_2 + \text{mod } R'_1$ | $R'_3 = 2^b R_3 + \text{mod } R'_2$ |
|   |   | $R_0 = \text{rem } R'_0$ | $R_1 = \text{rem } R'_1$ | $R_2 = \text{rem } R'_2$ | $R_3 + \text{rem } R'_3$ |

For a first word $X_0$, in remainder cell 32, the bits from register 12 for a first word $X_0$ are first entered into an adder 44. Adder 44 receives a second input from a multiplier 46. Multiplier 46 multiplies the outputs of register 48 and ROM 36. Since at the end of each frame, the clear signal on line 27 clears register 48, for the first byte in register 12, the output of multiplier 46 is 0. The output of adder 44 is entered on line 50 to a multiplier 52 and an adder 54. An inverter 55 is used to invert the parameter m from mode selector 18 thereby generating a parameter 1/m described in more detail below. Multiplier 52 in effect divides the output of adder 44 by m and generates a quotient which has two components: an integer component Q and a fractional component Fr. Instead of this scheme, a true division may also be performed. However, multiplication by the inverse—because it is easier and cheaper to implement—is preferable. Fractional component Fr is truncated to 0. The integer quotient Q is multiplied in multiplier 56 by m to scale it back to the magnitude before the operation of multiplier 52. The output of multiplier 56 is fed to adder 54 which subtracts it from the output of adder 44 on line 50. The output of adder 54 is the remainder of first word $X_0$ from register 12 when divided by m. This remainder is stored in register 48 as a remainder $R_0$. The remainder is always less than m. The quotient Q passes through adders 244 and 254 of remainder cell 40 and is stored in register 248 as a remainder $R_1$.

If a multiplication by the inverse 1/m rather than a true division is performed, a quantizing error is introduced into the process. A check may be performed at the end of each initiation to insure that, as a result of this quantizing error, the output of adder 54 is not too large. For example, the output of adder 54 may be compared to m. An output bigger than m is unacceptable. This error may be corrected by subtracting m from the output of adder 54 (several times if necessary) until the adder is reduced below m. For each correction, the integer component Q on line Q must be increased by one.

In this table, the $R_i$ indicates the output of the initial adder of the $i^{th}$ cell. Thus when second word $X_1$ is read into the first remainder cell 32, intermediate parameter $R_0'$ is given by $$R_0' = 2^b R_0 + X_1.$$

After the remainders for all the bytes of a frame have been generated, baud counter 24 generates a pulse on line 27 which, as previously mentioned, clears the registers 48, 248, 448 of each of the remainder cells. However, the information from these registers is transferred before clearing to respective storage registers 62, 64, 68.

In the next four baud periods (for f=4), the remainder cells convert the next four bauds as described above. Meanwhile, multiplexer switch 70 samples each of the storage registers 62, 64, ... 68, starting with the most significant baud found in storage register 68. The remainders stored therein are then sequentially transferred by switch 70 to QAM encoder 20. The QAM encoder also receives the modulus m from mode selector 18. The switch 70 may be stepped from one storage register to another by the clock pulses on line 26. The same clock pulses may also be used by the encoder 20 to generate the proper QAM signals. All remainders are limited to values between 0 and m−1. As a result, the last remainder cell 42 has a zero integer component Q, and overflow or non-zero Q is prevented. The modulus m is chosen to be the smallest integer not less than $2^c$ where c=bit rate/baud rate. Since $m^f \geq 2^{(b_0+b_1+b_2+b_3)}$, thus the modulus is chosen such that overflow cannot occur. The bit rate is achieved with the smallest possible signal constellation or modulus.

The output of encoder 20 is fed to transmitter circuitry 72 which generates corresponding analog signals for transmission over channel 74.

Figure 4:
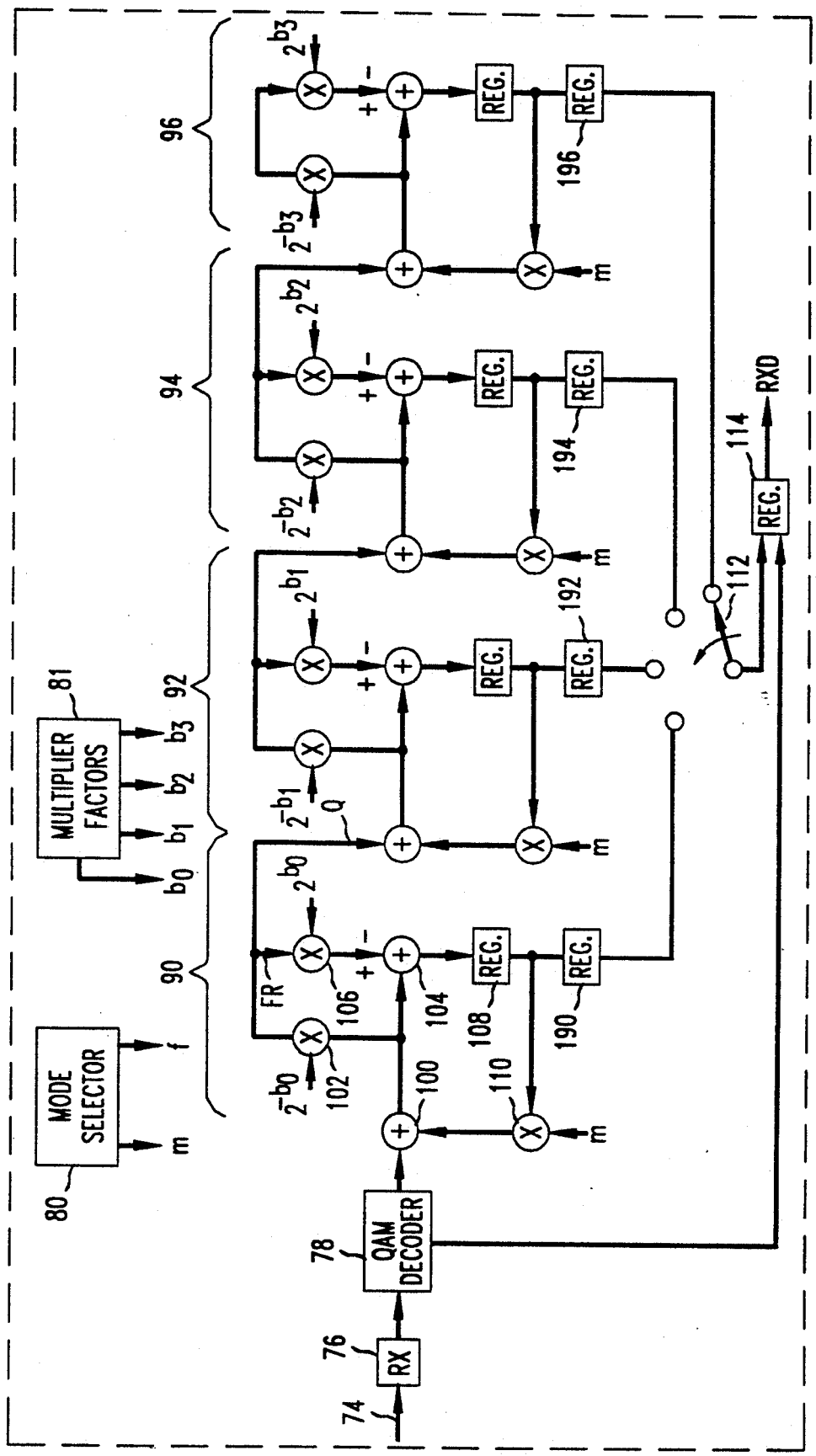
FIG. 4 shows details of the modulus converter for the receiver of FIG. 2.

At the receiver end, as shown in FIG. 4, analog signals from channel 74 are converted into digital signals by receiver circuitry 76, corresponding to all the circuitry in FIG. 2 up through network 1050. These digital signals are fed to QAM decoder 78, corresponding to decoder 1052. Decoder 78 performs Viterbi decoding to provide the "coded bits" directly to register 114, corresponding to register 1062 of FIG. 2. There is also mode selector 80 which is used to generate the parameters m and f in a manner identical to mode selector 18. Multipliers $b_0$, $b_1$, $b_2$, $b_3$ and their inverses are stored in a register 81. Alternatively, the inverses of these parameters are calculated as described more fully above. (Selector 80 and register 81, in combination, correspond to mode selector 1060 of FIG. 2.)

The remaining outputs of decoder 78 pass on to the remainder circuitry of FIG. 4, corresponding to modulus converter 1058. Again, the number of remainder circuits is equal to the number of words per frame f. The remainder circuits are used to convert the fractionally encoded signals into standard binary signals. In remainder circuit 90, the bits corresponding to the first received baud from a given frame are fed to an adder 100. The output of adder 100 is fed to a multiplier 102 and another adder 104. Multiplier 102 divides its input by $2^{b0}$ to generate a truncated integer Q described above. The integer Q is fed into a second multiplier 106 which multiplies by $2^{b0}$. The output is subtracted from the output of adder 100 by adder 104 to generate a first remainder. This first remainder is stored in register 108. The quotient Q is processed by the next remainder circuit 92.

In the next band period, multiplier 110 multiplies the output remainder in register 108 by m and the product is added to the bits corresponding to the next baud from QAM decoder 78 by adder 100. The whole process is then repeated. At the end of the frame, the buffer registers of the remainder circuits 90, 92, 94, 96 contain the remainders which are saved in buffer register 190, 192, 194, 196 and are multiplexed by a switch 112, starting with the output of the last remainder circuit 96. The binary signals from switch 112 are then fed to a register 114 for further processing.

Operation of the receiver remainder circuits is identical to the transmitter except the multiplier coefficients are changed. These coefficients are generally pre-computed. The inverse, for example, depends on the register size used in the converter. For 16-bit registers, the inverse is computed as 65536/m or $(1/m)(2^{16})$. The division is then accomplished by keeping only the most significant 15 bits of the 31-bit product of two 16-bit 2's compliment numbers. This is effectively a right shift of 16 bits or division by 65536. Note that $2^{-16} = 1/65536$.

In the receiver, the remainder circuits are restoring the original binary words with integer numbers of bits as they were received in register 12 at the transmitter. Thus, the multipliers $2^{-bi}$ and $2^{bi}$ in the receiver can be accomplished by shift operations.

Table II illustrates typical coefficients for 3200 bauds using 16-bit registers selected in accordance with the principles set forth above.

TABLE II

EXAMPLE OF PRE-COMPUTED COEFFICIENTS FOR ALL DATA RATES AT 3200 BAUD USING 16 BIT REGISTERS

| Data Rate | C | m | 1/m | $2^{b3}$ | $2^{-b3}$ | $2^{b2}$ | $2^{-b2}$ | $2^{b1}$ | $2^{-b1}$ | $2^{b0}$ | $2^{-b0}$ |
|---|---|---|---|---|---|---|---|---|---|---|---|
| 24000 | 15/2 | 182 | 360 | 256 | 256 | 128 | 512 | 256 | 256 | 128 | 512 |
| 21600 | 27/4 | 108 | 606 | 128 | 512 | 128 | 512 | 128 | 512 | 64 | 1024 |
| 19200 | 6 | 64 | 1024 | 64 | 1024 | 64 | 1024 | 64 | 1024 | 64 | 1024 |
| 16800 | 21/4 | 39 | 1680 | 64 | 1024 | 32 | 2048 | 32 | 2048 | 32 | 2048 |
| 14400 | 9/2 | 23 | 2849 | 32 | 2048 | 16 | 4096 | 32 | 2048 | 16 | 4096 |
| 12000 | 15/4 | 14 | 4681 | 16 | 4096 | 16 | 4096 | 16 | 4096 | 8 | 8192 |
| 9600 | 3 | 8 | 8192 | 8 | 8192 | 8 | 8192 | 8 | 8192 | 8 | 8192 |
| 7200 | 9/4 | 5 | 13107 | 8 | 8192 | 4 | 16384 | 4 | 16384 | 4 | 16384 | m = smallest integer $\geq 2^c$
1/m = $2^{16}/m$

Fractional rate modulation will allow a designer to build a data transmission device to operate in any bandwidth and at any data rate. For most channels, the bandwidth is obvious because of filters known to be used in the channel circuitry. For example, PCM channel filters used in the common D4 channel bank reject signal frequencies below 100 HZ or above 3700 HZ. Submarine cable channels reject signal frequencies below 200 HZ or above 3000 HZ. The channel bandwidth is determined by taking the difference between the upper and lower band limits, giving 3600 HZ or 2800 HZ respectively. The carrier frequency for QAM modulation is the average of the upper and lower band limits, giving 1900 HZ or 1600 HZ respectively.

For fractional rate modulation, the baud rate is set equal to the channel bandwidth. The highest possible baud rate is desirable to improve signal-to-noise ratios and to reduce throughput delay.

Figure 5:
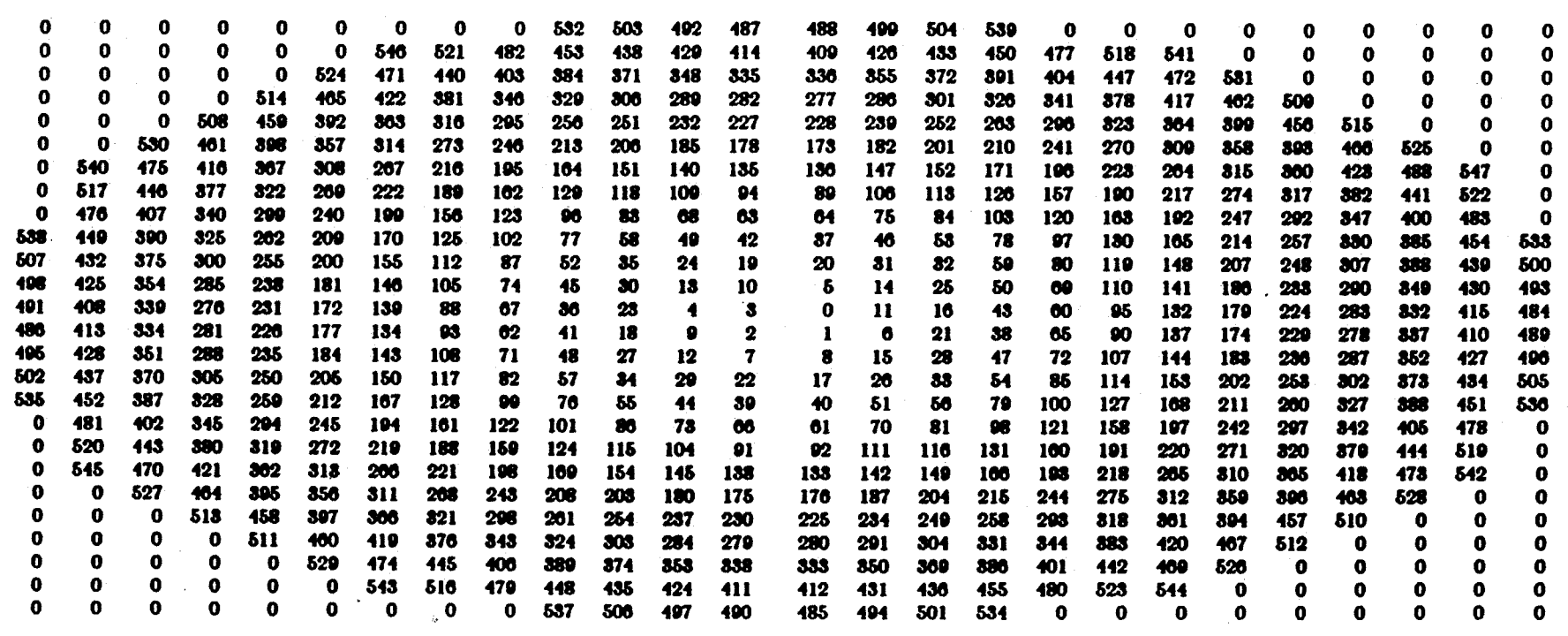

A computer look-up table (which may be part of the QAM encoder 20) can be used to encode and decode the fractional rate modulated signal points. FIG. 5 identifies up to 548 signal points, point 0 being at the center of the constellation corresponding to the x=1, y=1 coordinates of a signal constellation point. Value 547 is on the perimeter on the right side of the constellation corresponding to the x=23, y=13 coordinates.

The computer table can be used for uncoded modulation with modulus as large as 548. The same constellation can be used for 4-dimensional (4 D) trellis coding with modulus as large as 137. The two least significant bits of each index correspond to a phase rotation as directed by a trellis encoder. The remaining bits identify the modulus converted index. For example, table values of 16, 17, 18, 19 correspond to signal points (5,1), (1,−5), (−5,−1), and (−1,5), respectively. With 4 D trellis coding, these points all correspond to the same modulus converted index 4, but different trellis encoded rotation bits of 0, 1, 2, or 3. The constellation may be increased to cover more values as required.

The present invention is directed to a technique, referred to as "data rate throttling" which takes advantage of the capabilities of the modulus converter, as described above, to allow the rate at which data is channel mapped and transmitted over a communication channel to be easily varied in small increments, as compared to the rather coarse increments allowed by the techniques known in the prior art.

Figure 8:
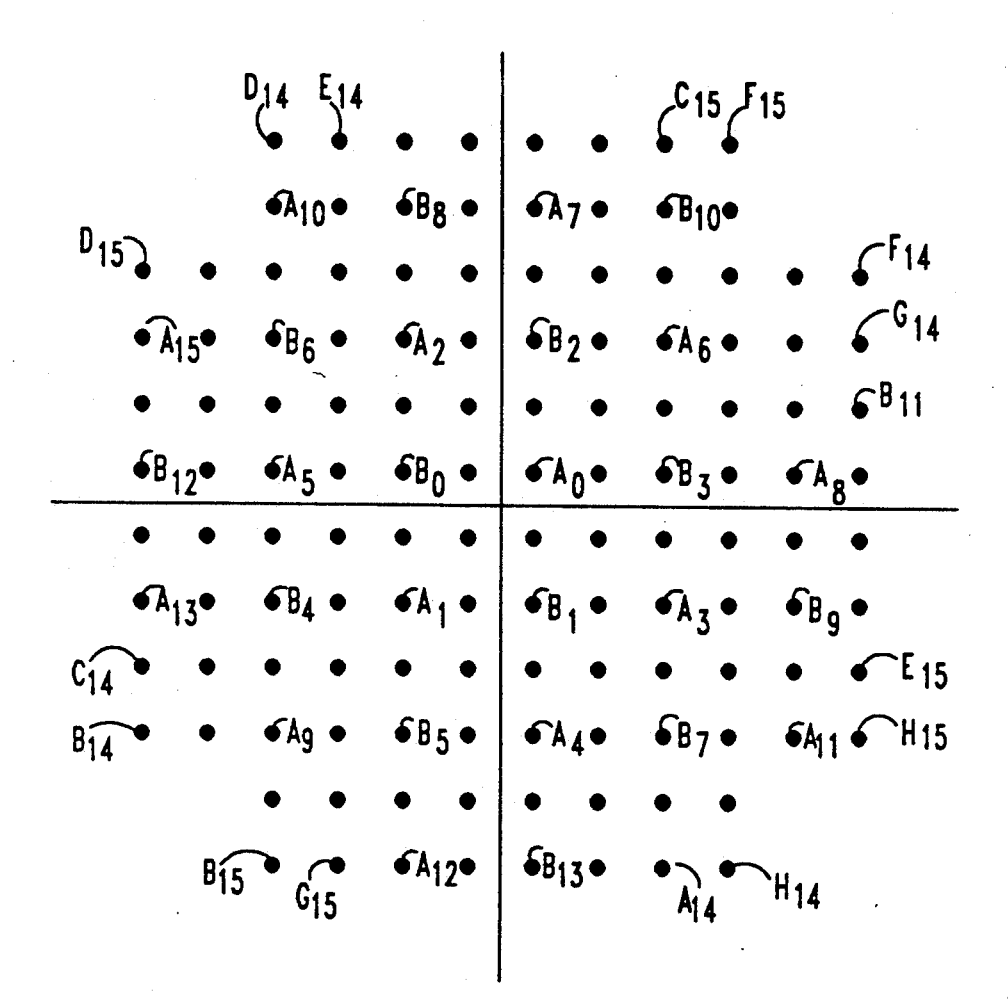

In accordance with the invention, at least one of the bit- and baud-rate signals generated by modem control 13 is varied—such as when it is desired to reduce the bit rate to a "fall back" rate and/or to thereafter return to the original rate—in such a way as to vary the value of c. This, of course, causes a change in the value of m. It can thus be seen that as changes in the bit and/or baud rate cause c, and thus m, to change, the modulus converter is caused to generate its values from various working sets of m different values. Those values are index values for the constellation. In particular, for each different index value generated by the modulus converter, an individual one of a predetermined plurality of channel symbols is selected. Specifically, in embodiments where redundancy coding is not used, each different index value is uniquely associated with a different symbol of the overall signal constellation being used, as is illustrated in FIG. 5. In embodiments where, as in the present illustrative embodiment, redundancy coding is used, each different index value is uniquely associated with a different symbol within each constellation subset. This is shown in FIG. 8, which depicts the portion of the constellation shown in FIG. 5 that is near the origin, but divided into eight subsets for use in the redundancy coding. In FIG. 8, more particularly, symbols labeled as $A_x$, $B_x$, ... $H_x$ belong to one of eight subsets A, B, ... H. Note that within each subset, there is a symbol uniquely associated with a particular index value x. Thus subset A includes symbols having the associated index values 0, 1, 2, ..., those being the symbols labeled $A_0$, $A_1$, $A_2$, etc. Similarly, subset B includes symbols having the associated index values 0, 1, 2, ..., those being the symbols labeled $B_0$, $B_1$, $B_2$, etc., and so forth for each of the subsets. Because of the numerous signal points in this constellation, it is unwieldy to specifically label each signal point to show what subset it belongs to. However, the 16 points of two of the subsets, subsets A and B, are explicitly labelled so that the constituent signal points of at least those two subsets can be readily seen. Other subsets are comprised of signal points laid out in similar geometric patterns. In particular, subsets C, E and G can be arrived at by clockwise rotation of subset A by 90, 180 and 270 degrees, respectively, while subsets D, F and H can be arrived at by clockwise rotation of subset B by 90, 180 and 270 degrees, respectively.

In either case, once the channel symbols have been selected responsive to the input data stream, a signal representing the selected channel symbols is transmitted over the communication channel. Thus as the modulus converter changes m, it causes the selection of channel symbols to be made from a correspondingly changed number of the channel symbols of either a) the overall constellation (for non-redundancy-coded embodiments) or b) the various subsets (for redundancy-coded embodiments).

The invention may be used to particular advantage in redundancy-coded applications in conjunction with the index value assignment scheme disclosed in the commonly-assigned application of W. L. Betts et al filed of even date herewith entitled "Index Assignment in Redundancy-Coded Data Communication Systems," Ser. No. 07/820,113, hereby incorporated by reference. As shown in FIG. 8—and in accordance with the invention taught in that patent application—the index values are assigned to the symbols of each subset in such a way that those index values change monotonically with increasing power of the signal points. Illustratively, in particular, the index values increase monotonically with increasing power of the signal points. Thus the signal point having the lowest power within a subset will have the lowest index value; the signal point having the second lowest power within a subset will have the second lowest index value; and so forth. This is advantageous because the upper limit of the range of index values that are output by the modulus converter increases (decreases) monotonically with increasing (decreasing) data rate and it is the modulus converter output which provides the aforementioned index values in response to the uncoded data. Thus, as data rate changes cause more or fewer channel symbols in each subset to be used for channel mapping at any given time, the channel symbols that are, in fact, used are, advantageously, always the signal points of lowest power within each subset.

It should be understood that the apparatus is preferably implemented by using a microprocessor rather than using discrete components.

Obviously, numerous modifications can be made to the invention without departing from its scope as defined in the appended claims.

We claim:

1. Apparatus comprising
   means for receiving a stream of input data,
   means for generating bit and baud rate signals respectively defining bit and baud rates at which said data is desired to be communicated over a communications channel,
   means for modulus converting said input data to generate an index value for each of a succession of baud intervals, each generated index value being one of a working set of m different index values, m being a modulus equal to the smallest integer not less than $2^c$, where c is the ratio of said bit rate to said baud rate,
   means for selecting, for each different index value generated by said means for modulus converting, an individual one of a predetermined plurality of channel symbols, said individual one of a predetermined plurality of channel symbols being uniquely associated with said index value,
   means for transmitting over said communications channel a signal representing the selected channel symbols, and
   means for varying at least one of said bit and baud rate signals in such a way as to vary the value of c, thereby causing said means for modulus converting to change said modulus and thereby causing said means for selecting to select from a correspondingly changed number of the channel symbols of said plurality, at least one value of said modulus being other than an integer power of 2.

2. The invention of claim 1 where said means for modulus converting includes partitioning means for partitioning said stream of input data into frames of equal number of bits, each frame being further partitioned into at least two words of unequal number of bits, and a plurality of transmit remainder calculating means for generating transmit remainders corresponding to said words based on said modulus, and encoding means for encoding said transmit remainders into bauds for transmission on said channel.

3. The invention of claim 2 further comprising means for receiving said bauds from said channel and including decoding means for decoding said bauds into receive remainders, and a plurality of receive remainder circuits for converting said receive remainders into received data using a modulus m conversion.

4. Apparatus comprising
   means for receiving input data, means for generating bit and baud rate signals respectively defining bit and baud rates at which said data is desired to be communicated over a communications channel, means for redundancy coding a first portion of the received data to identify, at said baud rate, a sequence of subsets of a predetermined constellation of channel symbols, means for modulus converting a second portion of said input data to generate index values each associated with a respective subset of said sequence, each generated index value being one of a working set of m different index values, m being a modulus equal to the smallest integer not less than $2^c$, where c is the ration of said bit rate to said baud rate, means for selecting, for each index value generated by said means for modulus converting, an individual one of the channel symbols of its associated subset, said individual one of the channel symbols being uniquely associated, within said subset, with said each index value, means for transmitting over said communications channel a signal representing the selected channel symbols, and means for varying at least one of said bit and baud rate signals in such a way as to vary the value of c, thereby causing said means for modulus converting to change said modulus and thereby causing said means for selecting to select from a correspondingly changed number of the channel symbols of said subset, at least one value of said modulus being other than an integer power of 2.

5. The invention of claim 4 wherein said means for modulus converting includes partitioning means for partitioning said second portion of said input data into frames of equal number of bits, each frame being further partitioned into at least two words of unequal number of bits, and a plurality of transmit remainder calculating means for generating transmit remainders corresponding to said words based on said modulus, and encoding means for encoding said transmit remainders into bauds for transmission on said channel.

6. The invention of claim 5 further comprising means for receiving said bauds from said channel and including decoding means for decoding said bauds into receive remainders, and a plurality of receive remainder circuits for converting said receive remainders into received data using a modulus conversion.

* * * * *